United States Patent
Desai et al.

(10) Patent No.: US 11,606,508 B1
(45) Date of Patent: Mar. 14, 2023

(54) ENHANCED REPRESENTATIONS BASED ON SENSOR DATA

(71) Applicant: Motorola Mobility LLC, Chicago, IL (US)

(72) Inventors: Rahul B. Desai, Hoffman Estates, IL (US); Amit Kumar Agrawal, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 17/529,642

(22) Filed: Nov. 18, 2021

(51) Int. Cl.
*H04L 65/403* (2022.01)
*H04N 5/262* (2006.01)
*G10L 25/51* (2013.01)
*G06V 20/40* (2022.01)
*G06V 40/20* (2022.01)
*G06V 40/16* (2022.01)

(52) U.S. Cl.
CPC .......... *H04N 5/2628* (2013.01); *G06V 20/40* (2022.01); *G06V 40/176* (2022.01); *G06V 40/20* (2022.01); *G10L 25/51* (2013.01); *H04L 65/403* (2013.01)

(58) Field of Classification Search
CPC .......... H04N 7/15; H04N 7/147; H04N 5/262; G06K 9/00; H04L 28/06
USPC ............................................ 348/14.01–14.16
See application file for complete search history.

(56) References Cited

U.S. PATENT DOCUMENTS

| | | | |
|---|---|---|---|
| 9,699,410 B1* | 7/2017 | Nagabushanam | G10L 25/57 |
| 10,108,851 B2 | 10/2018 | Bandameedipalli et al. | |
| 10,924,709 B1* | 2/2021 | Faulkner | H04L 65/403 |
| 2011/0285808 A1* | 11/2011 | Feng | H04N 7/142 |
| | | | 348/E7.083 |
| 2017/0041556 A1* | 2/2017 | Aiba | H04N 5/77 |
| 2017/0265012 A1* | 9/2017 | Tico | H04S 7/303 |
| 2022/0237735 A1* | 7/2022 | Zingade | H04N 7/147 |

OTHER PUBLICATIONS

Russell, Brandon, "Galaxy S21 features wireless support for Samsung DeX on PC", XDA Developers Blog [online][retrieved Jun. 8, 2021], Retrieved from the Internet <https://www.xda-developers.com/galaxy-s21-wireless-support-samsung-dex-on-pc/>., Feb. 5, 2021, 7 pages.

* cited by examiner

*Primary Examiner* — Melur Ramakrishnaiah
(74) *Attorney, Agent, or Firm* — FIG. 1 Patents

(57) ABSTRACT

Techniques for generating enhanced representations based on sensor data are described and are implementable in a video conference setting. Generally, the described implementations enable an enhanced representation of a focal individual, for instance a speaker, to be generated based on sensor data, for instance audio and visual sensor data. The audio data can identify an individual as the speaker or determine a general location of a source of audio. Visual sensors can detect gestures of individuals located in the general location of the source of audio to identify gestures which indicate that one or more individuals are speaking or are about to speak.

20 Claims, 11 Drawing Sheets

ENHANCED REPRESENTATIONS BASED ON SENSOR DATA

BACKGROUND

The modern work model is in the midst of a paradigm shift from the traditional in-person setting to working from home or remotely. As such, in today's business context, hybrid meetings and events which include in-person participants as well as remote participants who are connected virtually have become commonplace. Hybrid meetings remove the traditional confines associated with in-person meetings and increase flexibility by allowing participants who would otherwise be unable or unwilling to attend in-person to be present.

However, hybrid meetings and events generate a host of new challenges. In an entirely virtual context, where each participant joins a call from their own respective device, it is usually simple to identify the speaker. For instance, a participant's name and webcam view might appear on screen when speaking. However, in a hybrid context where several participants are sharing the same device (e.g., a conference camera) it is often difficult for a remote participant to identify who the speaker is or locate the speaker on their respective display device. Moreover, it is frequently difficult to hear individuals speaking in a hybrid meeting context, for instance where the speaker is located far away from the audio capture device or multiple people are speaking at the same time. These problems can be frustrating for users, reduce flexibility and efficiency, and offset the benefits associated with the hybrid work model.

BRIEF DESCRIPTION OF THE DRAWINGS

Aspects of enhanced representations based on sensor data are described with reference to the following Figures. The same numbers may be used throughout to reference similar features and components that are shown in the Figures.

DETAILED DESCRIPTION

Figure 1:
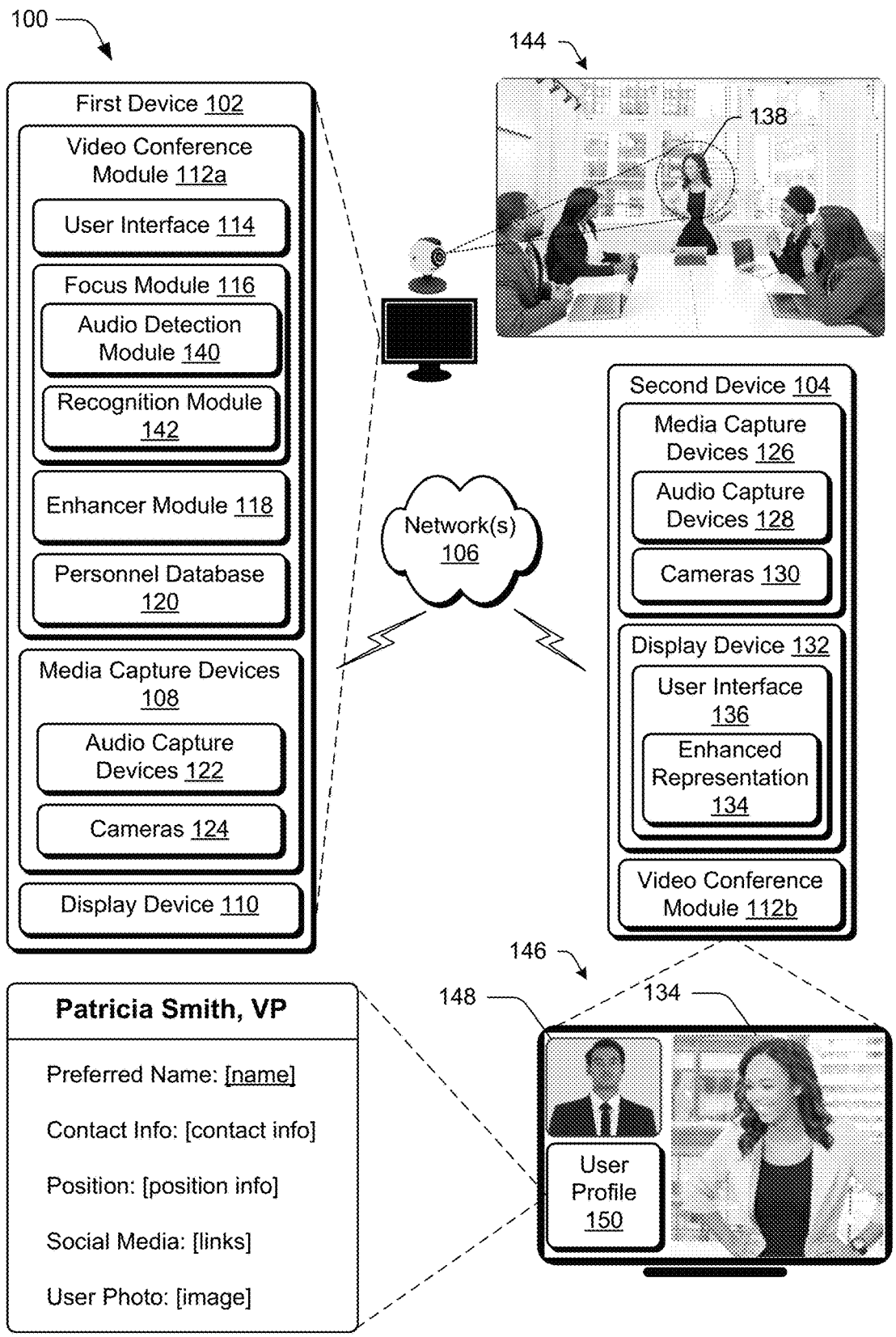
FIG. 1 illustrates an example environment in which aspects of enhanced representations based on sensor data can be implemented.

Techniques for enhanced representations based on sensor data are described and may be implemented in a virtual conference setting to generate enhanced representation of participants in the virtual conference. Generally, the described implementations utilize sensor data from a first device and/or set of devices to generate an enhanced representation which is communicated to a second device for display in a user interface of the second device. The enhanced representation provides a remote participant a virtual "seat at the table," and further delivers additional information that is not conventionally available to a user in a hybrid conference setting. For instance, a remote user can easily identify and view a focal individual, as well as quickly gain relevant information about the individual from the enhanced representation.

According to various implementations, a first device (e.g., a conference camera device) is communicatively coupled with a second device (e.g., a mobile device, home computer with webcam, laptop, docked mobile device connected to a monitor, etc.) to enable video conferencing. For instance, several participants in a video conference are located in the same room ("in-person participants"), such as a conference room, sharing the same first device, e.g., conference camera device. Further, other participants are located remotely, e.g., working from home using their own respective second devices. The first and second device are able to communicate audio and visual data in real time, such as through a video conferencing application.

Continuing with the above example, initially the first device may utilize an "ultrawide view" to ensure that in-person participants are shown in the same field of view. When an in-person individual begins speaking, one or more audio sensors of the first device can detect audio data, such as to identify the individual as the speaker or determine a general location of a source of audio. Visual sensors can detect gestures of individuals located in the general location of the source of audio to identify gestures which indicate that one or more individuals are speaking or are about to speak. Gesture information can include facial gestures which indicate that an individual is speaking such as a moving mouth, or certain expressions, and can also include other gestures for instance a raised hand, standing up, particular gesticulations, etc. Gesture information may also include gestures detected from surrounding participants. For instance, where the gazes of nearby participants are directed to the same individual this indicates that the individual is the speaker.

Based on the audio data and gesture information, a focal individual is identified, for instance, an individual who is speaking, is about to speak, or who "has the floor." The identifying can also include ascertaining an identity of the focal individual, such as using facial recognition and/or voice recognition. In an example, personnel profiles stored in a personnel database include particular information about specific participants. For instance, the personnel profiles include information such as a participant's name, position, job description, department, links to social media accounts, contact information, technical background, company designation, expertise, etc. The personnel profiles also include biometric data such as facial features and voice features associated with a specific participant. By comparing the detected audio data and/or gesture information with biometric data from personnel profiles, an identity of the focal individual can be determined. The personnel profiles may also be iteratively updated, as the video conference progresses. For example, audio data and gesture information associated with the focal individual can be collected during the meeting and incorporated into an existing or newly created personnel profile for the respective focal individual.

The identification of a focal individual can also include filtering location specific profile information that includes location details about specific participants. For instance, a position map is generated that represents a "seating chart" that identifies where specific participants are located throughout the conference room. In an example, the seating chart is generated at the start of the call, for instance by detecting facial gestures and collecting audio data for the in-person participants. Facial recognition and/or voice recognition enable the respective identities of the in-person participants to be determined, and a location associated with each participant is stored in the location specific profile. The seating chart may also be provided by a participant, for instance the meeting host. In another example, the seating chart is dynamically updated as participants move about the environment, e.g., the conference room.

As part of the identifying, multiple levels of verification can be used. In one or more examples, the audio data is validated against the gesture information. Further, the identity of the focal individual can be verified by validating the audio data and/or the gesture information against the biometric data included in the personnel profiles. In another example, the location specific profile information can be used as part of the verification, for instance against the audio data and/or the gesture data and/or the biometric data included in the personnel profile. In this way, the multiple levels of verification reduces the incidence of misidentification of a non-speaking participant as a focal individual, or misidentification of the identity of the focal individual.

Once a focal individual is identified, an enhanced representation containing enhanced audial and visual digital content is generated. In an example, the enhanced representation processes content associated with the focal individual for display. For instance, content that is known about the focal individual is combined with content that is detected from the focal individual. The enhanced representation may include a zoomed in view of the focal individual, which can provide a "face-to-face" view for a remote user. The zoomed in view may be obtained through a secondary camera, for instance a telephoto camera with enhanced zoom capabilities. The first device may also use super-resolution techniques to improve the resolution of the enhanced representation.

Further, the enhanced representation may suppress audio that does not originate with the focal individual. For example, the first device may utilize beamforming technology to identify the audio coming from the focal individual, and suppress other detected audio input, for instance side conversations, environmental noise, interruptions, etc. The audio settings of the enhanced representation can also be enhanced, for instance using immersive sound or spatialized audio. In this way, the enhanced representation can simulate an audial perspective relative to the first device and make the remote participant "feel as if they were there."

The enhanced representation can also include a user profile associated with the focal individual, which includes information obtained from the personnel database. The user profile provides a variety of information, such as the focal individual's name, position, job description, department, links to social media accounts, contact information, technical background, company designation, expertise, etc. The user profile may also include information provided by the focal individual, for instance status indicators, meeting handouts, talking points, agendas, etc. The enhanced representation may also include a picture of the focal individual, which is particularly helpful in situations where the focal individual may be out of view or turned away from the first device (e.g., conference camera). The inclusion of a user photo may be responsive to detecting that the focal individual is out of view or is turned away from the first device. In another example, the enhanced representation includes a roster of in-person participants detected as being present with the focal individual. Once the enhanced representation is generated, the enhanced representation is communicated to the second device for display. A number of display configurations for the enhanced representation are contemplated, for instance side by side with a main display, as the primary display, picture-in-picture, etc.

In one example, the display configuration of the enhanced representation in the user interface of the second device is based on the position of the speaker. For instance, a spatial position of the focal individual is determined, such as relative to a video capture device or camera of the first device. In this example, the enhanced representation is generated based on the spatial position, for instance by including an orientation tag that indicates a desired display orientation for the enhanced representation. Accordingly, when communicated to the second device for display, the enhanced representation may be positioned in the user interface of the second device based on the spatial position of the focal individual. For example, where the focal individual is located to the left of the first device, the enhanced representation is displayed on the left-hand side of the in the user interface of the second device. In this way, the gaze of the remote user of the second device mimics an in-person context by simulating a perspective view of the focal individual relative to the first device. That is, the remote user may appear to be naturally looking in the direction of the speaker.

Accordingly, the techniques described herein provide a remote participant a virtual "seat at the table," as well as provide additional information that is not conventionally available to a user in a hybrid conference setting.

While features and concepts of enhanced representations based on sensor data can be implemented in any number of environments and/or configurations, aspects of enhanced representations based on sensor data are described in the context of the following example systems, devices, and methods.

FIG. 1 illustrates an example environment 100 in which aspects of enhanced representations based on sensor data can be implemented. The environment 100 includes a first device 102 and a second device 104 that are communicatively coupled via a wired or wireless connection, for instance via a network 106. In this particular example, the first device 102 represents a conference camera device. The second device 104 represents a laptop computer, a desktop computer, or a portable device that can be carried by a user, such as a smartphone or a tablet device. In other examples, the second device 104 can be implemented as a docked mobile device connected to a monitor. These examples are not to be construed as limiting, however, and the first device 102 and/or the second device 104 can be implemented in a variety of different ways and form factors. Example attributes of the first device 102 and the second device 104 are discussed below with reference to the device 1000 of FIG. 10.

The first device 102 includes various functionality that enables the first device 102 to perform different aspects of generating enhanced representations based on sensor data discussed herein, including media capture devices 108, a display device 110, and a video conference module 112a. The second device 104 also includes a video conference module 112b. While the functionality made possible by the video conference module 112a is primarily discussed with respect to the first device 102, the same functionality is also possible with respect to the video conference module 112b of the second device 104. The video conference module 112a is illustrated as including a user interface 114, a focus module 116, an enhancer module 118, and a personnel database 120.

The media capture devices 108 are representative of functionality to enable various types of media to be captured via the first device 102, such as visual media and audio media. In this particular example the media capture devices 108 include audio capture devices 122 and video capture devices including cameras 124. The media capture devices 108, however, can include a variety of other devices that are able to capture various types of media in accordance with the implementations discussed herein. Generally, the media capture devices 108 include not only hardware for capturing associated media but also logic (e.g., drivers, firmware, etc.) for operating and configuring operation of the associated media capture devices 108. The display device 110 represents functionality (e.g., hardware and logic) for enabling video output via the first device 102.

Similarly, the second device 104 also includes media capture devices 126, which are representative of functionality to enable various types of media to be captured via the second device 104, such as visual media and audio media. In this particular example the media capture devices 126 include audio capture devices 128 and video capture devices such as cameras 130. The media capture devices 126, however, can include a variety of other devices that are able to capture various types of media in accordance with the implementations discussed herein. Generally, the media capture devices 126 include not only hardware for capturing associated media but also logic (e.g., drivers, firmware, etc.) for operating and configuring operation of the associated media capture devices 126. The display device 132 represents functionality (e.g., hardware and logic) for enabling video output via the second device 104. In particular, the display device 132 is implemented to display an enhanced representation 134 generated by the first device 102 in a user interface 136.

Generally, the video conference module 112a is implemented at least partially in hardware of the first device 102 to identify a focal individual 138 using an audio detection module 140 and a recognition module 142 of the focus module 116. The identity of the focal individual can also be ascertained, for instance through facial recognition and/or voice recognition as further described below. The video conference module 112a is further implemented at least partially in hardware of the first device 102 to generate the enhanced representation 134 of the focal individual 138, for instance by the enhancer module 118. As further described below the enhanced representation 134 can also include a user profile, which includes information obtained from the personnel database 120. Once the first device 102 generates the enhanced representation 134, it is communicated to the second device 104 for display in the user interface 136 of the second device 104.

Example operations for generating the enhanced representation 134 are shown in first and second stages 144 and 146. In the example, the first device 102 and second device 104 are communicatively coupled for a video conference call. Several participants are sharing use of the first device 102 (e.g., a conference camera) while a remote participant is using the second device 104. At first stage 144, the first device 102 identifies a focal individual 138 based on audio data and gesture information obtained by the audio detection module 140 and recognition module 142. In this case, the focal individual 138 is identified as the woman standing in the center of the scene, for instance based on audio data that suggests she is speaking (e.g., audio detected in her location) and gesture information that indicates she is speaking (e.g., mouth open, standing up, other participants are looking at her). The identity of the woman is also determined, for instance using facial recognition and/or voice recognition by comparing the audio data and gesture information with biometric data stored in the personnel database 120. Once she is identified, the first device 102 can generate an enhanced representation 134 of the focal individual 138 using the enhancer module 118.

At second stage 146, the enhanced representation 134 is communicated to the second device 104 for display on a display device 132. Along with the enhanced representation 134, the display device 132 is also illustrated as including a view of the remote user 148. In this example, the enhanced representation 134 includes a zoomed in view of the focal individual 138, alongside a user profile 150 for the focal individual 138 which includes information obtained from the personnel database 120. The user profile 150 can include a wide array of information, for instance the name, job title, preferred name, contact information, position, social media links, and a user photo for the focal individual 138. By automatically generating and displaying an enhanced representation 134 of a focal individual 138, the techniques described herein allow the remote user to easily identify and view the focal individual 138, as well as quickly gain relevant information about her.

Having discussed an example environment in which the disclosed techniques can be performed, consider now some example scenarios and implementation details for implementing the disclosed techniques.

Figure 2A:
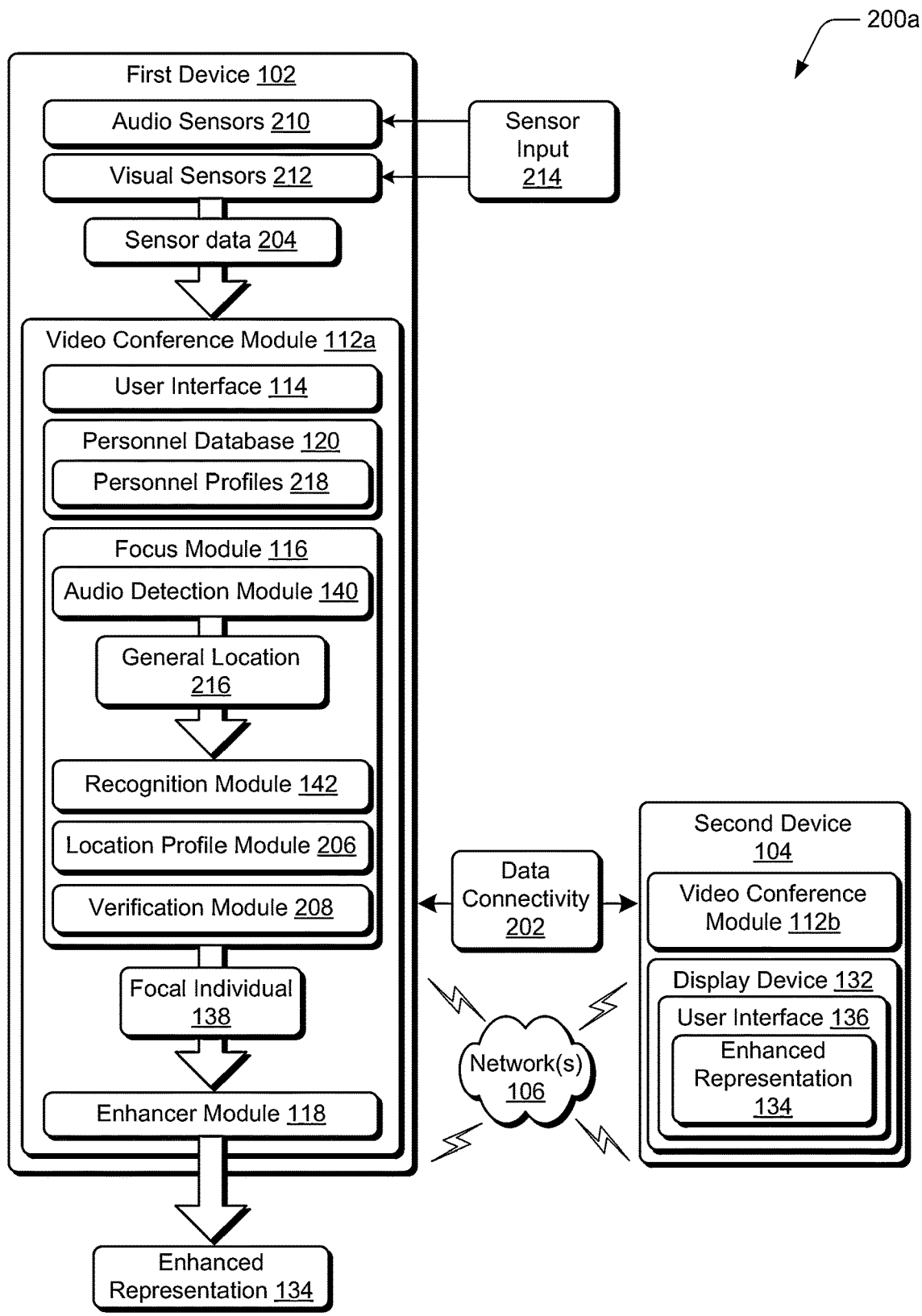
FIG. 2a depicts an example system for generating enhanced representations based on sensor data.

FIG. 2a depicts an example system 200a for generating enhanced representations based on sensor data. Generally, the system 200a can be implemented in the environment 100 and incorporates attributes of the environment 100 introduced above.

In the example system 200a the first device 102 and the second device 104 interface to establish data connectivity 202 between the first device 102 and the second device 104. Generally, the data connectivity 202 is implemented via wireless and/or wired connectivity between the first device 102 and the second device 104 for exchanging data between the devices. The data connectivity 202, for instance, is implemented via direct wireless and/or wired connectivity between the first device 102 and the second device 104, and/or via data communication over the network 106 between the first device 102 and the second device 104. In a wireless scenario the data connectivity 202 can be established as direct device-to-device connectivity between the first device 102 and the second device 104 and utilizing any suitable wireless protocol, such as Wi-Fi Direct, Bluetooth™ (including Bluetooth™ Low Energy (BLE), ultra-wideband (UWB), Near Field Communication (NFC)), LTE direct, NR sidelink, and so forth.

Further, the example system 200a shows operation of the video conference module 112a, which is illustrated as including the user interface 114, the personnel database 120, the focus module 116, and the enhancer module 118. The focus module 116 is implemented to identify the focal individual 138 and is further illustrated as including the audio detection module 140, the recognition module 142, a location profile module 206, and a verification module 208.

In an example, the first device 102 and second device 104 are communicatively coupled via the video conference modules 112a, 112b, such as part of a video conferencing application. Audio sensors 210, such as the audio capture devices 122, and visual sensors 212, such as the video capture devices including cameras 124, are operable to capture sensor input 214 from an environment surrounding the first device 102. From the captured sensor input 214, sensor data 204 is generated by the first device 102. The sensor data 204, for instance, includes visual and audial attributes of the surrounding environment. Using the sensor data 204 the audio detection module 140 can determine whether a particular individual is speaking and/or determine a general location 216 of a source of audio. The recognition module 142 can use the sensor data 204 to detect gestures of individuals located in the general location 216 of the source of audio to identify gestures which indicate that one or more individuals are speaking or are about to speak. Gesture information can include facial gestures which indicate that an individual is speaking such as a moving mouth or certain expressions, and can also include non-facial gestures such as a raised hand, standing up, particular gesticulations, etc. Gesture information may also include gestures detected from surrounding participants. For instance, where the gazes of nearby participants are directed to the same individual, this may indicate that the individual is the speaker.

Based on a combination of the audio data and the gesture information, a focal individual 138 is identified, such as an individual who is speaking or about to speak. The identity of the focal individual can also be determined, for instance through voice recognition and facial recognition. In an example, personnel profiles 218 stored in the personnel database 120 include particular information about specific participants. For instance, the personnel profiles 218 include information such as a participant's name, position, job description, department, links to social media accounts, contact information, technical background, company designation, expertise, etc. The personnel profiles 218 also include biometric data such as facial features and voice features associated with a specific participant. By comparing the detected audio data and/or gesture information with biometric data from personnel profiles 218, an identity of the focal individual 138 can be determined. The personnel profiles 218 may also be iteratively updated, for instance as the video conference progresses. For example, audio data and gesture information associated with the focal individual can be collected during the meeting and incorporated into an existing or newly created personnel profile 218 for the respective focal individual 138. In some examples, the identification of a focal individual 138 can also include filtering location specific profile information that includes details about specific participants by a location profile module 206. For instance, a "seating chart" that identifies where specific participants are located throughout the conference room as further discussed with respect to FIG. 9.

In one or more examples, the verification module 208 is operable to validate that the identified focal individual 138 is speaking or is about to speak. For instance, the verification module can verify the audio data against the gesture information. Further, the verification module 208 can also be used to verify the identity of the focal individual 138, such as by validating the audio data and/or the gesture information against the biometric data included in the personnel profiles 218. In another example, the location specific profile information can be used as part of the verification, for instance against the audio data and/or the gesture data and/or the biometric data included in the personnel profile. In this way, utilizing multiple levels of verification (e.g., twofold and/or threefold verification) reduces the likelihood of misidentification of a non-speaking participant as a focal individual 138, or misidentification of the identity of the focal individual. The identified focal individual 138 is communicated to the enhancer module 118, which is operable to generate an enhanced representation 134 containing audial and visual digital content as discussed in further detail with respect to FIG. 2b.

Figure 2B:
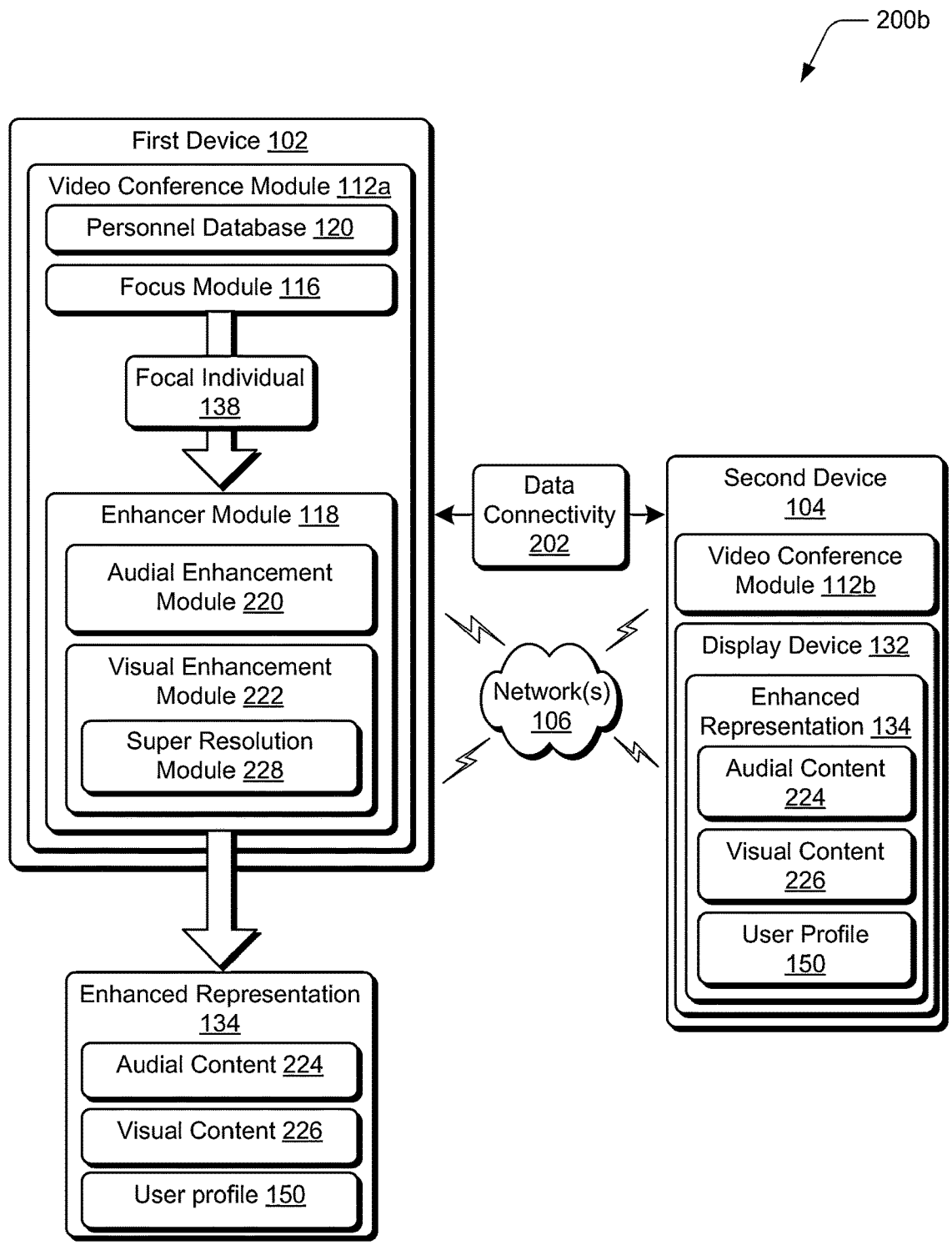
FIG. 2b depicts an example system for generating enhanced representations based on sensor data.

FIG. 2b depicts an example system 200b for generating enhanced representations based on sensor data, continuing from the example system 200a illustrated in FIG. 2a. Generally, the system 200b can be implemented in the environment 100 and incorporates attributes of the environment 100 introduced above. The system 200b, for instance, describes more detailed operation of the enhancer module 118 for generating the enhanced representation 134. Continuing with the above example, the focus module 116 communicates the focal individual 138 to the enhancer module 118, which is illustrated as including an audial enhancement module 220 and visual enhancement module 222.

The audial enhancement module 220 is operable to enhance the quality of audial content 224 included in the enhanced representation 134. The audial content 224, for example, is extracted from the sensor data 204 generated by the system 200a. For instance, to enhance the quality of audial content 224, the audial enhancement module 220 suppresses audio that does not originate with the focal individual 138. In one example, the audial enhancement module 220 may utilize beamforming technology to identify the audio coming from the focal individual 138 and suppress extraneous audio, such as side conversations, environmental noise, interruptions, etc. The audio settings of the enhanced representation 134 can also be enhanced by the audial enhancement module 220, for instance using immersive sound or spatialized audio. In this way, the enhanced representation 134 can include audial content 224 which simulates an audial perspective relative to the first device and make the remote user "feel as if they were there."

Similarly, the visual enhancement module 222 is operable to enhance the quality of the visual content 226 included in the enhanced representation 134. The visual content 226, for example, is extracted from the sensor data 204 generated by the system 200a. For instance, to enhance the quality of the visual content 226, the visual enhancement module 222 may generate a zoomed in view of the focal individual 138, which can provide a "face-to-face" view for a remote user. The zoomed in view may be obtained through a secondary camera, for instance a telephoto camera with enhanced zoom capabilities. The visual enhancement module 222 may also use software based super-resolution techniques to improve the resolution of the enhanced representation 134, for instance through use of a super-resolution module 228.

Further, the visual enhancement module 222 can access the personnel database 120 to generate and include the user profile 150 associated with the focal individual 138 in the enhanced representation 134. The user profile 150 can provide a variety of information, such as the name, position, job description, department, links to social media accounts, contact information, etc. of the focal individual 138. The enhanced representation 134 can also include a picture of the focal individual 138, for instance responsive to detecting that the focal individual 138 is out of view or turned away from the video capture device of the first device 102.

After generating the enhanced representation 134 the first device 102 communicates the enhanced representation 134 to the second device 104 for display. A number of display configurations for the enhanced representation are contemplated, for instance side-by-side with a main display, as the primary display, alongside a view of the remote user 148 of the second device 104, picture-in-picture, etc. In one example, the configuration of the enhanced representation 134 is based on the position of the focal individual 138. For instance, a spatial position of the focal individual 138 is determined, such as relative to the camera 124 of the first device 102. The enhanced representation 134 is generated based on the spatial position, for instance by including an orientation tag that indicates a desired display orientation for the enhanced representation 134. Accordingly, when communicated to the second device 104 for display, the enhanced representation 134 can then be positioned in the user interface 136 of the second device 104 based on the spatial position of the focal individual 138. For example, where the focal individual 138 is located to the left of the camera 124, the enhanced representation 134 is displayed on the left-hand side of the user interface 136 of the second device 104. In this way, the gaze of the remote user of the second device 104 mimics an in-person context by simulating a perspective view of the focal individual 138 relative to the first device 102. That is, the remote user may appear to be naturally looking in the direction of the speaker.

Figure 3:
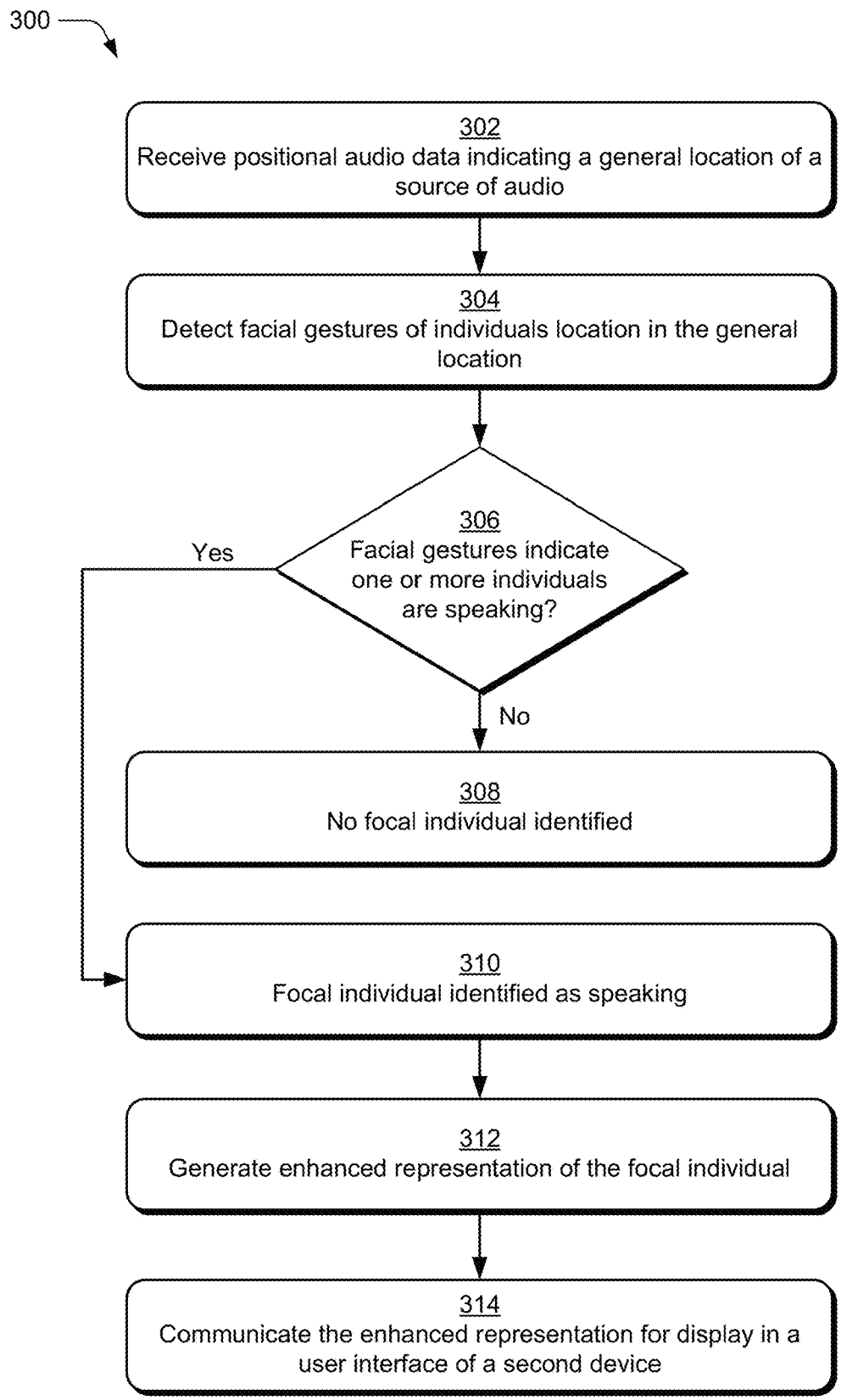
FIG. 3 illustrates an example method for generating enhanced representations based on sensor data including validating positional audio data against gesture information.

FIG. 3 illustrates an example method 300 for generating enhanced representations based on sensor data including validating positional audio data against gesture information. At 302, positional audio data indicating a general location of a source of audio is received. For instance, the positional audio data may indicate an area where a detected speaker is located. At 304, facial gestures of individuals located in the general location of the source of audio are detected. Facial gestures may indicate that an individual located in the general location 216 is speaking or is about to speak. For instance, a moving mouth may indicate that an individual is speaking.

At 306, a determination is made as to whether the facial gestures indicate that one or more individuals are speaking. It is determined, for instance, whether an individual located in the general location of a source of audio is speaking. For example, the positional audio data is validated against the facial gesture information. If the facial gestures do not indicate that one or more individuals are speaking (i.e., "No" from 306) at 308 no focal individual is identified. Alternatively, if the facial gestures indicate that one or more individuals are speaking (i.e., "Yes" from 306) then at 310 a focal individual is identified as speaking.

Continuing to 312 an enhanced representation of the focal individual is generated. Various ways for generating an enhanced representation are described throughout this disclosure. At 314, the enhanced representation is communicated to a second device for display. The enhanced representation 134, for example, is communicated to the second device 104 for display, such as in a user interface 136 of a display device 132 of the second device 104.

Figure 4:
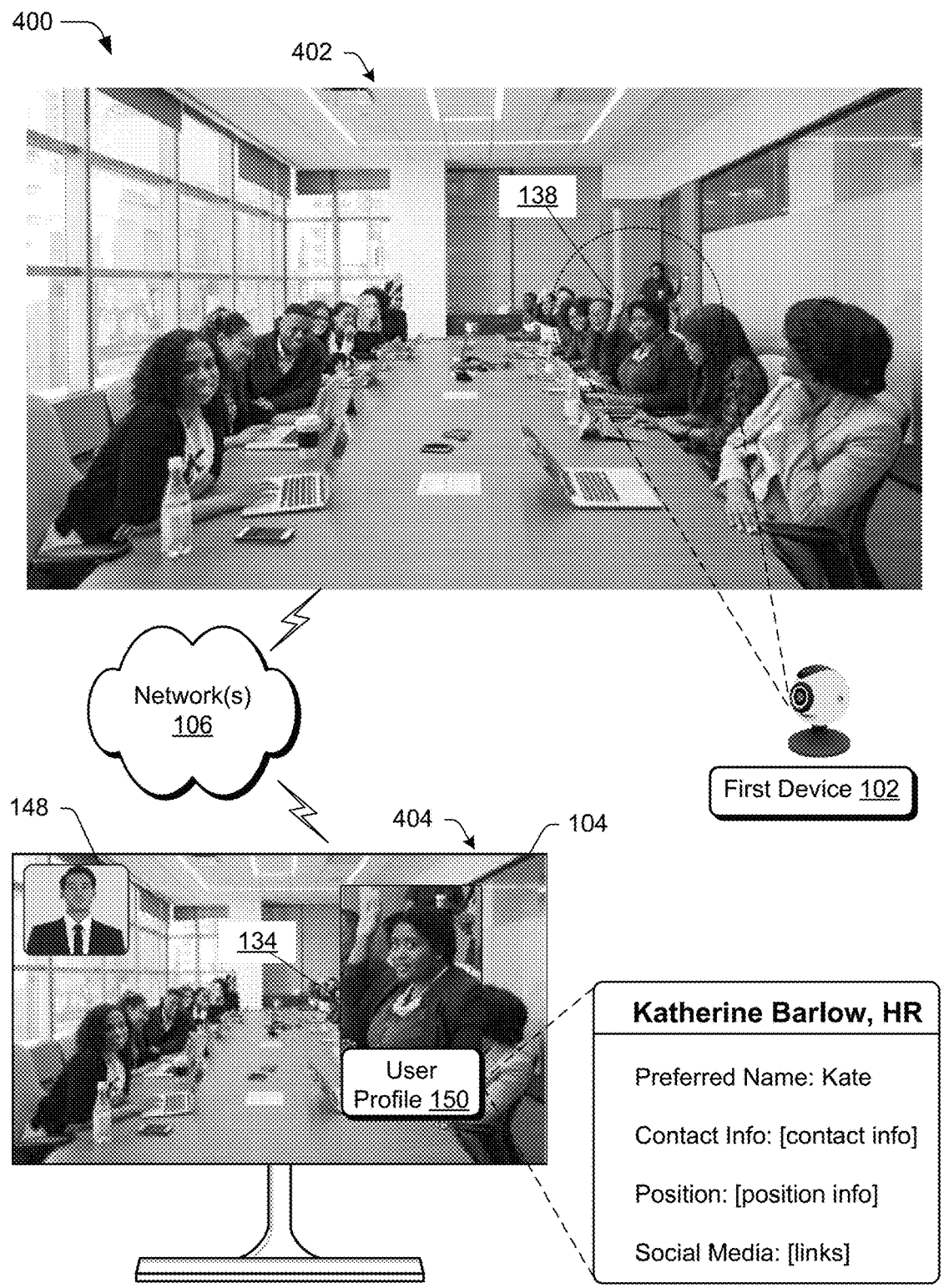
FIG. 4 depicts an example implementation for generating an enhanced representation based on sensor data.

FIG. 4 depicts an example implementation 400 for generating an enhanced representation based on sensor data. In this example, shown in first and second stages 402 and 404, the first device 102 and the second device 104 are communicatively coupled for a video conference call. Several in-person participants are sharing use of the first device 102 (e.g., a conference camera) while a remote participant is using the second device 104. At first stage 402, the first device identifies a focal individual 138 based on audio data and gesture information obtained from the audio sensors 210 and visual sensors 212. In this case, the focal individual 138 is identified as the woman with her hand raised on the right side of the scene. The identity of the woman is also ascertained, for instance through facial recognition and/or voice recognition by comparing the audio data and gesture information with biometric data stored in the personnel database 120. The first device 102 can then generate an enhanced representation 134 of the focal individual 138 using the enhancer module 118.

At second stage 404, the enhanced representation 134 is communicated to the second device 104 for display in the user interface 136. Along with the enhanced representation 134, the display device 132 is also illustrated as including a view of the remote user 148. In this example, the enhanced representation 134 includes a zoomed in view of the focal individual 138, along with a user profile 150 for the focal individual 138. The user profile 150 can include a wide array of information, in this instance the user profile 150 includes the focal individual 138's name, department information, preferred name, contact information, position, and social media links.

Further, in this example a spatial position of the focal individual 138 is determined relative to the camera 124 of the first device 102. In this case, the focal individual is located to the right of the camera 124. The enhanced representation 134 is positioned in the user interface 136 of the second device 104 based on the spatial position of the focal individual 138. Accordingly, the enhanced representation 134 is displayed on the right-hand side of the display device 132 of the second device 104. In this way, the enhanced representation 134 is automatically and intuitively positioned in the user interface 136 of the second device 104, such that the gaze of the remote user of the second device 104 mimics an in-person context. That is, the remote user may appear to be naturally looking in the direction of the speaker. By automatically generating and displaying an enhanced representation 134 of a focal individual 138 based on sensor data, the techniques described herein allow the remote user to easily identify and view the focal individual 138, as well as quickly gain relevant information about her.

Figure 5:
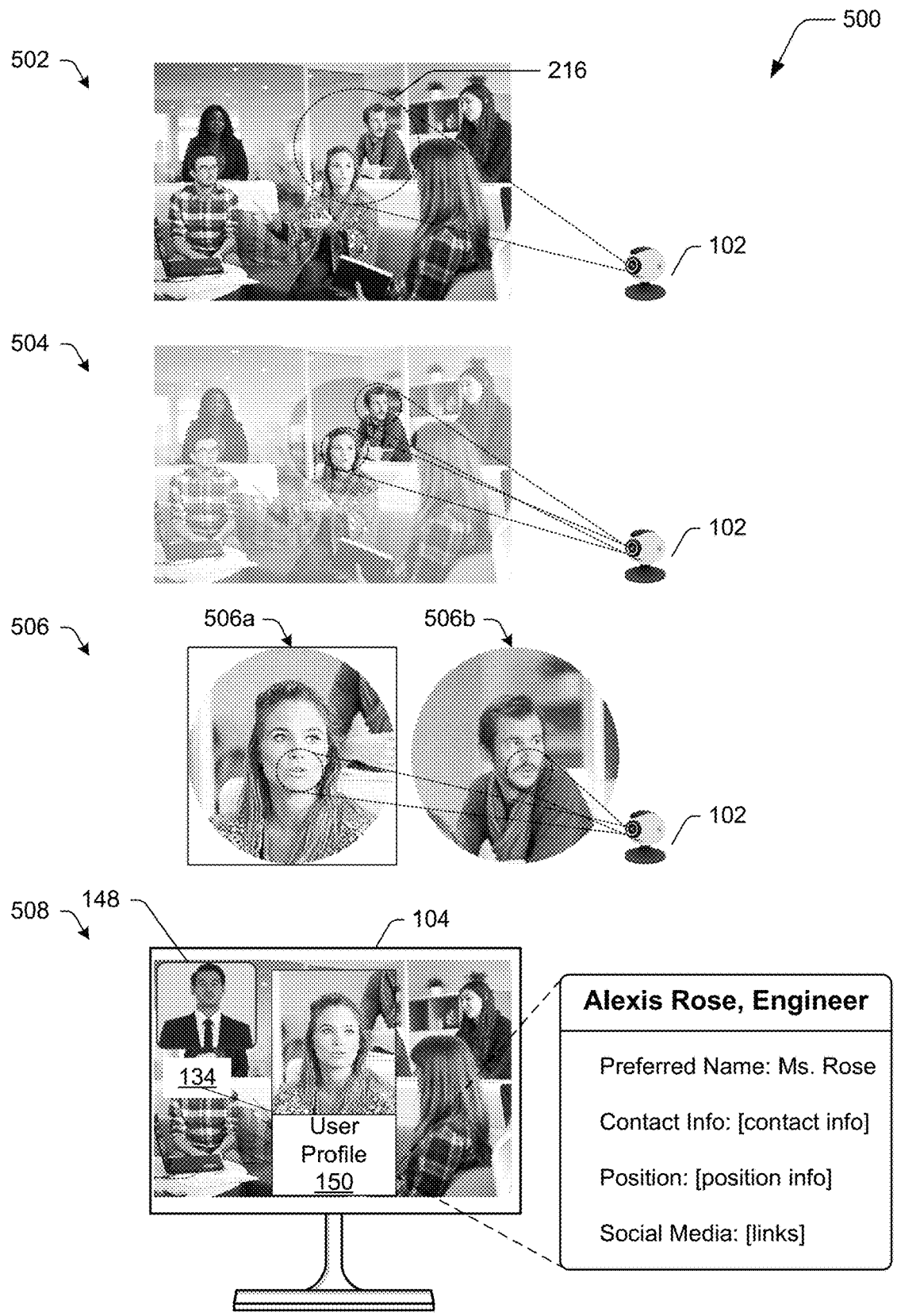
FIG. 5 depicts an example implementation for generating an enhanced representation based on sensor data including verification of a focal individual based on facial gestures.

FIG. 5 depicts an example implementation 500 for generating an enhanced representation based on sensor data including verification of a focal individual based on facial gestures. In this example, shown in first, second, third, and fourth stages 502, 504, 506, and 508, the first device 102 and the second device 104 are communicatively coupled for a video conference call. Several in-person participants are sharing use of the first device 102 (e.g., a conference camera) while a remote participant is using the second device 104. At first stage 502, the first device identifies a general location 216 that is a source of audio, for instance using audio sensors 210. The general location 216 is depicted as the area enclosed by the dotted circle. At second stage 504, two individuals within the general location 216 are isolated and identified as potential focal individuals 138.

At third stage 506, gesture information for the two individuals is detected, for instance using visual sensors 212 of a recognition module 142. In this example, the gesture information includes mouth movements. As shown at 506*a*, the mouth of the woman is moving which suggests that she is speaking. As shown at stage 506*b*, on the other hand, the mouth of the man is closed, indicating that he is not currently speaking. Accordingly, based on the audio data and the gesture information, the woman is identified as the focal individual 138. Thus, by validating the audio data against the gesture information the techniques described herein ensure that a non-speaking individual, for instance the man shown at 506b, is not misidentified as a focal individual 138. In this example the identity of the woman is also determined, for instance through facial recognition and/or voice recognition.

At stage 508, an enhanced representation 134 is generated for the woman identified as the focal individual 138 and is communicated to the second device 104 for display on a display device 132. Along with the enhanced representation 134, the display device 132 is also illustrated as including a view of the remote user 148. In this example, the enhanced representation 134 includes a zoomed in view of the woman. The zoomed in view is positioned in the user interface 136 of the display device 132 based on the spatial position of the focal individual 138 relative to the first device 102 (e.g., a conference camera). That is, the woman is located in the center of the scene relative to the first device 102, and the enhanced representation 134 is likewise positioned in the center of the display device 132 of the second device 104.

The enhanced representation also includes a user profile 150 for the focal individual 138, which includes information obtained from the personnel database 120. The user profile 150 can include a wide array of information, in this instance the user profile 150 includes the woman's name, job title, preferred name, contact information, position, and social media links. By automatically generating and displaying an enhanced representation 134 of a focal individual 138 based on sensor data, the techniques described herein allow the remote user to easily identify and view the focal individual 138, as well as quickly gain relevant information about her.

Figure 6:
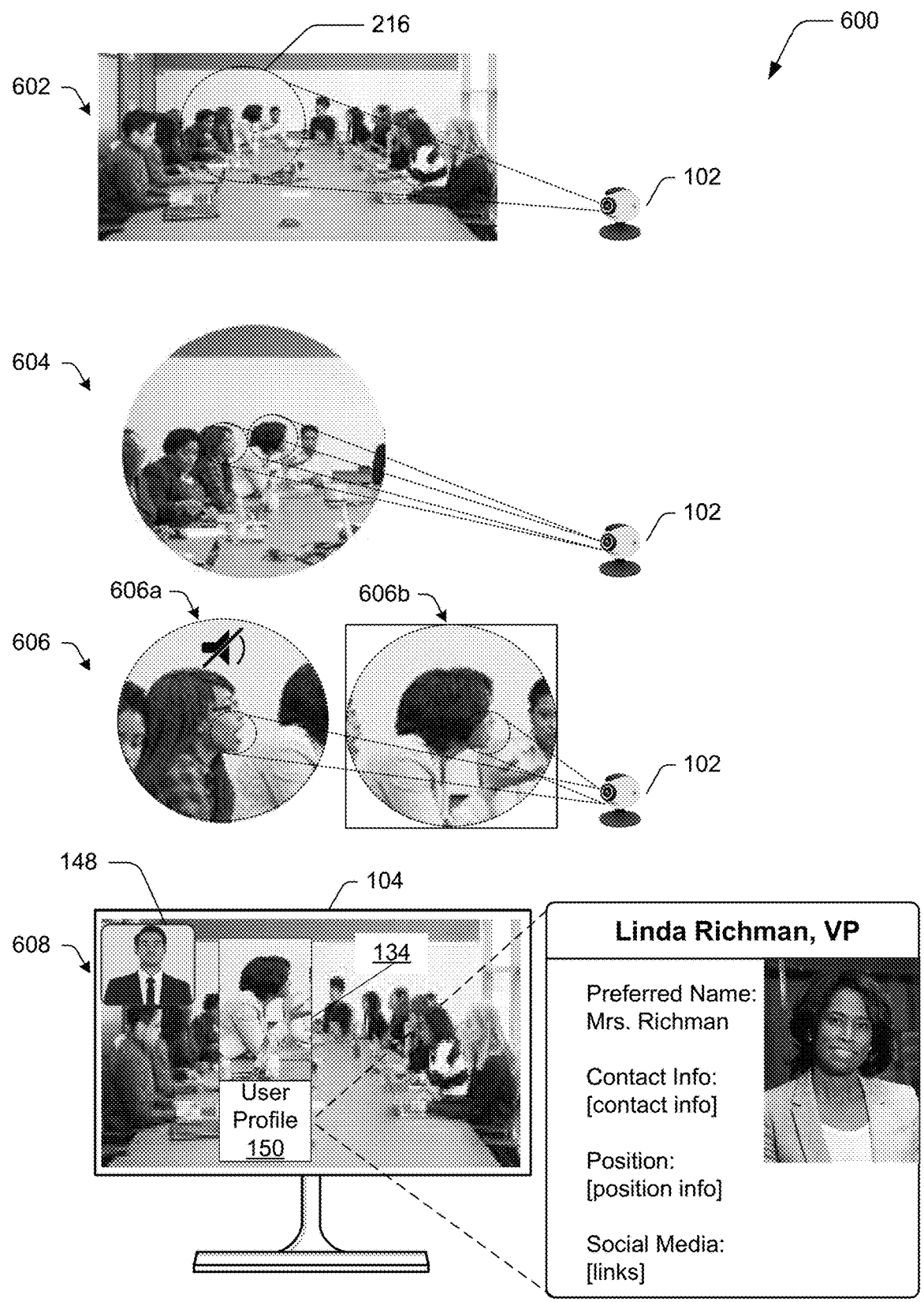
FIG. 6 depicts an example implementation for generating an enhanced representation based on sensor data further demonstrating features of the enhanced representation.

FIG. 6 depicts an example implementation 600 for generating an enhanced representation based on sensor data demonstrating features of the enhanced representation. In this example, shown in first, second, third, and fourth stages 602, 604, 606, and 608, the first device 102 and the second device 104 are communicatively coupled for a video conference call. Several in-person participants are sharing use of the first device 102 (e.g., a conference camera) while a remote participant is using the second device 104. At first stage 602, the first device 102 identifies a general location 216 that is a source of audio, for instance using one or more audio sensors 210. The general location 216 is shown as the area enclosed by the dotted circle. At second stage 604, two individuals within the general location 216 are isolated and identified as potential focal individuals 138.

At third stage 606, gesture information for the two individuals is detected, for instance using one or more visual sensors 212. In this example, the gesture information includes mouth movements as well as particular gesticulations. As noted at 606a, the mouth of the woman on the left is open, however, in this example the combination of audio data and gesture information indicate that any audio content originating from the woman on the left is extraneous audio data, e.g., interruption, yawning, side conversation, etc.

Alternatively, as shown at stage 606b, the mouth of the woman on the right is open, and she is gesticulating with her hand in a manner that indicates that she is speaking. Moreover, the gazes from the surrounding participants are directed towards her. In some examples, gesture information may also include gestures detected from surrounding participants. For instance, where the gazes of the nearby participants are detected as being directed to the woman, this indicates that she is the speaker.

Accordingly, based on the audio data and the gesture information, the woman in 606b is identified as the focal individual 138. Thus, by validating the audio data against the gesture information the techniques described herein ensure that the speaking individual is properly identified. In this example the identity of the woman is also determined, for instance through facial recognition and/or voice recognition. Further, at stage 606a extraneous audio (e.g., such as side conversations, environmental noise, interruptions, etc.) from the woman on the left is suppressed, for instance through an audial enhancement module 220.

At stage 608, an enhanced representation 134 is generated for the woman identified at stage 606 as the focal individual 138 and is communicated to the second device 104 for display in a user interface 136 of the second device 104. Along with the enhanced representation 134, the user interface 136 is also illustrated as including a view of the remote user 148. In this example, the enhanced representation 134 includes a zoomed in view of the focal individual 138. The zoomed in view is positioned in the user interface 136 based on the spatial position of the focal individual 138 relative to the first device 102 (e.g., a conference camera). That is, the woman is located left of center of the scene relative to the first device 102, and the enhanced representation 134 is likewise positioned left of center in the user interface 136 of the second device 104.

The enhanced representation 134 also includes a user profile 150 for the focal individual 138, which may include information obtained from a personnel database 120. The user profile 150 can include a wide array of information, in this instance the user profile 150 includes the focal individual 138's name, job title, preferred name, contact information, position, and social media links. The enhanced representation 134 also includes a user photo for the focal individual 138, for instance responsive to detecting that the focal individual is out of view or has turned away from the video capture device of the first device 102. In this way, the remote user can still view the face of the speaker, even when she is not looking at the camera 124. Further, by automatically generating and displaying an enhanced representation 134 of a focal individual 138 based on sensor data, the techniques described herein allow the remote user to easily identify and view the focal individual 138, as well as quickly gain relevant information about her.

Figure 7:
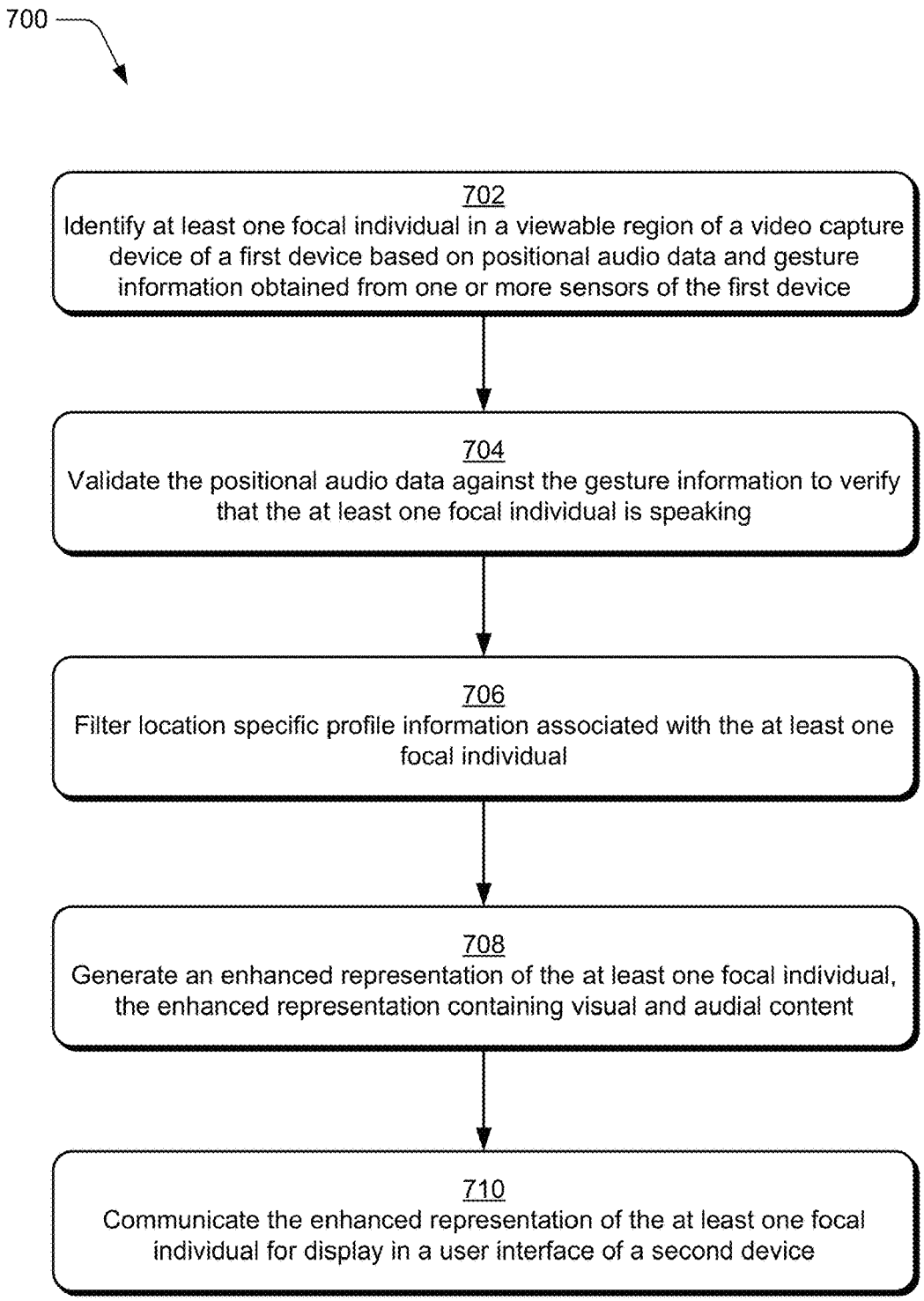
FIG. 7 illustrates a flow chart depicting an example method for generating enhanced representations based on sensor data.

FIG. 7 illustrates a flow chart depicting an example method 700 of generating enhanced representations from sensor data in accordance with one or more implementations. At 702, a focal individual within a viewable region of a video capture device of the first device is identified. For instance, the focal individual 138 is identified based on positional audio data as well as gesture information obtained from one or more audio sensors 210 and/or visual sensors 212 of the first device 102. At 704, the positional audio data is validated against the gesture information to verify that the identified focal individual is speaking or about to speak. At 706, location specific profile information associated with the at least one focal individual is filtered. For instance, the gesture information and/or the positional audio data is correlated to a location map that identifies where specific individuals are located throughout the conference room as further described with respect to FIG. 9. In this way, the multiple levels of verification (e.g., twofold and/or threefold verification) reduces the incidence of misidentification of the speaker.

At 708, an enhanced representation of the focal individual is generated. The enhanced representation 134 may contain both visual content 226 and audial content 224. For instance, the enhanced representation 134 may include an enhanced zoomed in view of the focal individual 138, enhanced audio, a user profile 150, and other visual content 226 and audial content 224 as described herein. At 710, the enhanced representation of the at least one focal individual is communicated to the second device for display in a user interface of the second device.

Figure 8:
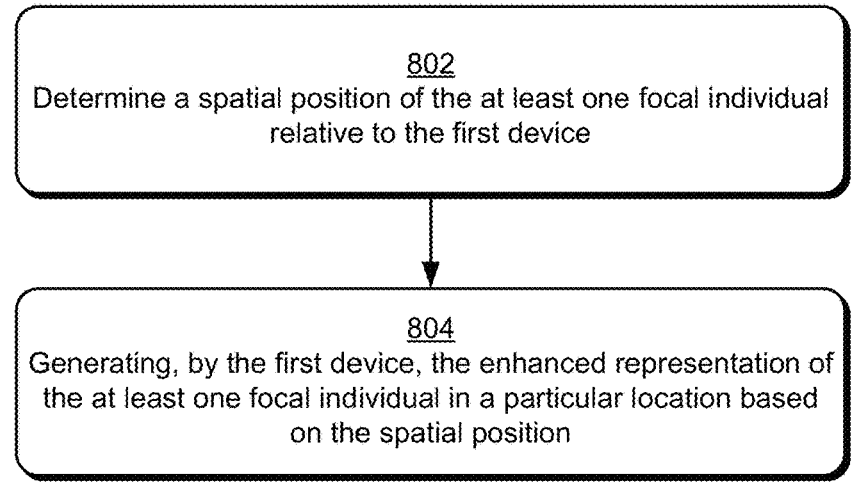
FIG. 8 illustrates a flow chart depicting an example method for generating enhanced representations from sensor data incorporating the position of the enhanced representation based on a spatial position of the focal individual.

FIG. 8 illustrates a flow chart depicting an example method 800 for generating enhanced representations from sensor data incorporating the position of the enhanced representation based on a spatial position of the focal individual in accordance with one or more implementations. The method 800, for instance is implemented as an example way of performing step 708 of method 700. At 802, a spatial position of at least one focal individual is determined relative to the first device. For instance, the spatial position corresponds to a position where a participant in a video conference is sitting in relation to a video capture device of the first device 102. At 804, an enhanced representation is generated based on the determined spatial position. For instance, an orientation tag can be included with the enhanced representation that indicates a specified display orientation for the enhanced representation 134. Accordingly, when communicated to the second device 104 for display, the enhanced representation may be positioned based on the orientation tag. In an example where the focal individual 138 is located to the left of the first device 102, the enhanced representation 134 is displayed on the left-hand side of the display device 132 of the second device 104. In this way, the gaze of a remote user of the second device 104 mimics an in-person context by simulating a perspective view of the focal individual 138 relative to the first device 102. That is, the remote user may appear to be naturally looking in the direction of the speaker.

Figure 9:
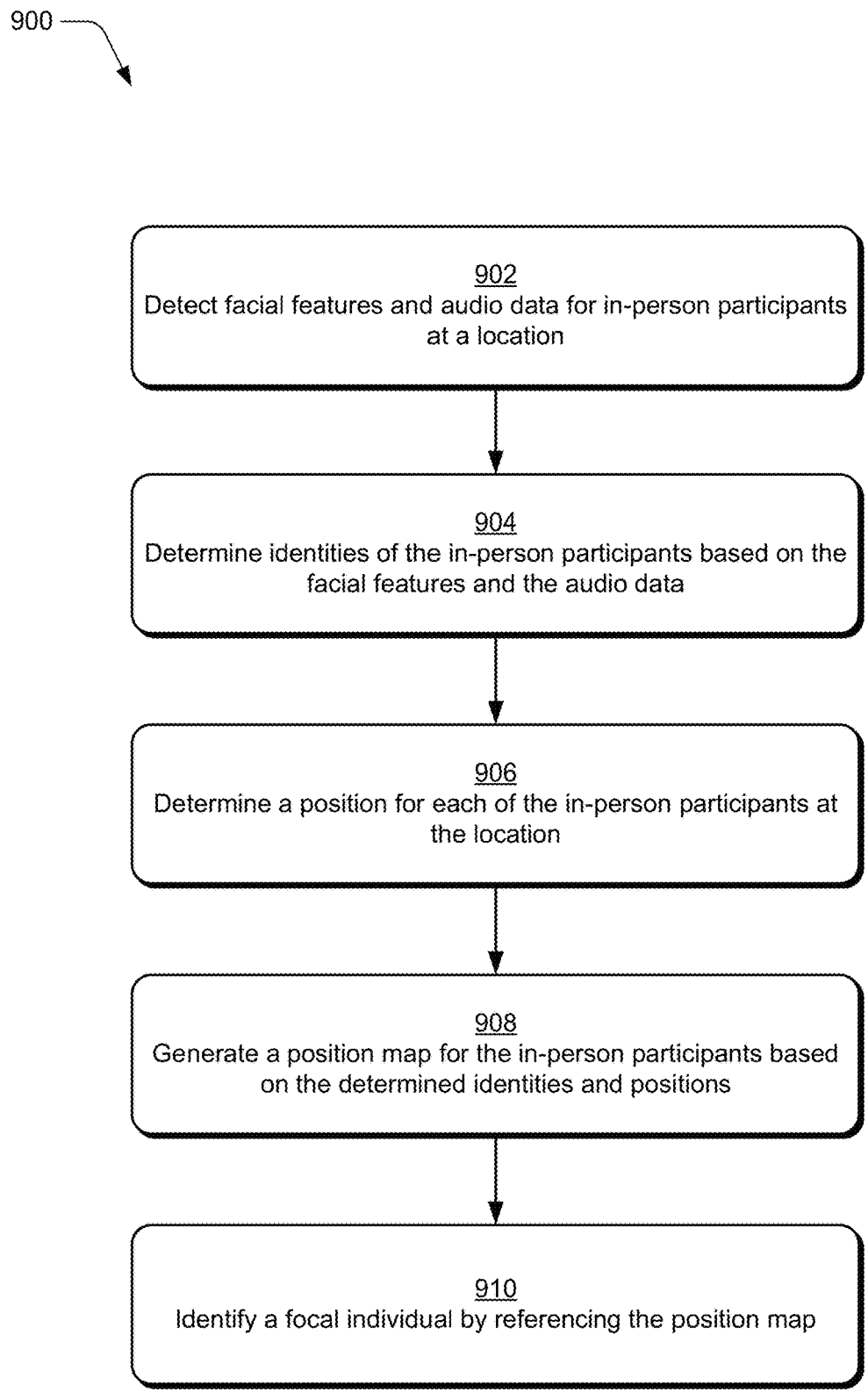
FIG. 9 illustrates a flow chart depicting an example method for tracking participant positions at a particular location in accordance with one or more implementations.

FIG. 9 illustrates a flow chart depicting an example method 900 for tracking participant positions at a particular location in accordance with one or more implementations. For instance, the method describes an example way for generating a "seating chart" that identifies where specific participants are located throughout a conference room and/or other location where multiple participants are present. At 902, facial features and audio data are detected for in-person participants at a location. In an example, the facial features and audio data are obtained from audio sensors 210 and/or visual sensors 212 of the first device 102 such as part of generating the sensor data 204. At 904, identities of the in-person participants are determined based on the facial features and the audio data. For instance, participant identities are determined using voice recognition and/or facial recognition techniques. In an example, the detected facial features and/or audio data are compared with biometric data from personnel profiles 218 to determine the identities of the in-person participants.

In at least one implementation an identity of a particular participant is not determinable, such as in a scenario where reference biometric identification data is not available for the particular participant. For instance, a personnel profile 218 for the particular participant is not available. In such a scenario the video conference module 112*a* can assign a temporary identity to the particular participant for purposes of tracking interactions of the particular participant (e.g., whether the particular participant is a focal individual) and for tracking position of the particular participant at the location.

At 906, a position for each of the in-person participants at the location is determined. For instance, the video conference module 112*a* utilizes the facial features and/or audio data to determine a position for each participant such as relative to a video capture device, e.g., the camera 124 of the first device 102. At 908, a position map for the in-person participants is generated based on the determined identities and positions. The position map, for instance, represents a seating chart that indicates a position and identity for each in-person participant at the location. In at least one implementation the position map is stored in a location specific profile for the location. In an example, the position map is dynamically updated as participants move about the location, e.g., a conference room. For instance, each participant may be tracked throughout the course of a video call, and the participant's location iteratively updated in position map of the location specific profile.

At 910, a focal individual is identified by referencing the position map. In an example, audio data and/or gesture information are detected that indicate that an individual is a focal individual, such as described above. Based on the position of the individual at the location and by correlating the position to the position map, the identity of the focal individual can be ascertained. In another example, position map information is validated against biometric data to confirm the identity of the speaker. In this way, utilizing a position map that identifies and dynamically tracks positions of different participants provides an added level of verification to reduce the incidence of misidentification of a focal individual.

Figure 10:
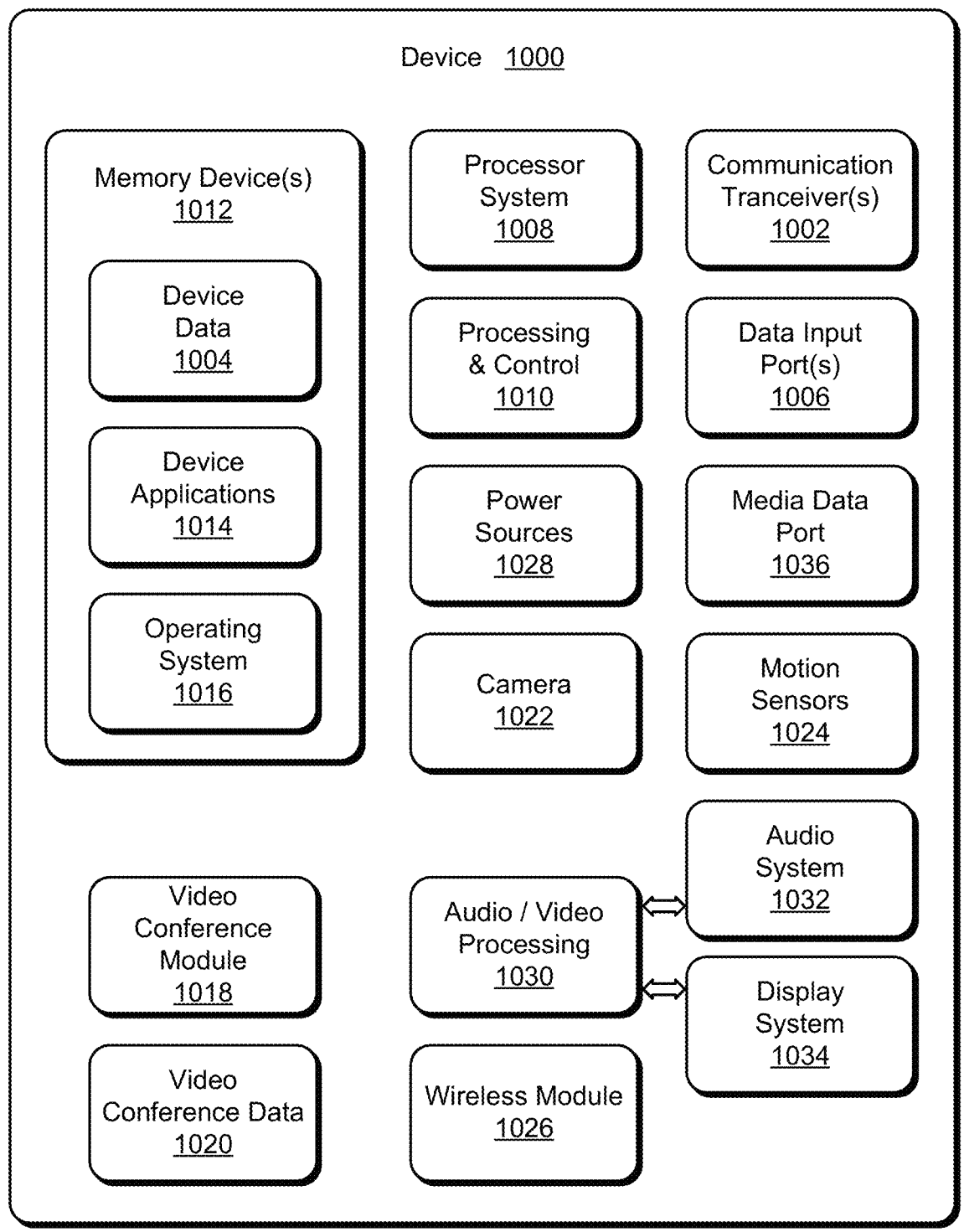
FIG. 10 illustrates various components of an example device in which aspects of enhanced representations based on sensor data can be implemented.

FIG. 10 illustrates various components of an example device 1000 in which aspects of enhanced representations based on sensor data can be implemented. The example device 1000 can be implemented as any of the devices described with reference to the previous FIGS. 1-9, such as any type of mobile device, mobile phone, mobile device, wearable device, tablet, computing, communication, entertainment, gaming, media playback, and/or other type of electronic device. For example, the first device 102 and/or the second device 104 as shown and described with reference to FIGS. 1-9 may be implemented as the example device 1000. In a wearable device implementation, the device may include any one or combination of a watch, armband, wristband, bracelet, glove or pair of gloves, glasses, jewelry items, clothing items, any type of footwear or headwear, and/or other types of wearables.

The device 1000 includes communication transceivers 1002 that enable wired and/or wireless communication of device data 1004 with other devices. The device data 1004 can include any of device identifying data, device location data, wireless connectivity data, and wireless protocol data. Additionally, the device data 1004 can include any type of audio, video, and/or image data. Example communication transceivers 1002 include wireless personal area network (WPAN) radios compliant with various IEEE 1002.15 (Bluetooth™) standards, wireless local area network (WLAN) radios compliant with any of the various IEEE 1002.11 (Wi-Fi™) standards, wireless wide area network (WWAN) radios for cellular phone communication, wireless metropolitan area network (WMAN) radios compliant with various IEEE 1002.16 (WiMAX™) standards, and wired local area network (LAN) Ethernet transceivers for network data communication.

The device 1000 may also include one or more data input ports 1006 via which any type of data, media content, and/or inputs can be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 1000 includes a processing system 1008 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that is implemented in connection with processing and control circuits, which are generally identified at 1010. The device 1000 may further include any type of a system bus or other data and command transfer system that couples the various components within the device. A system bus can include any one or combination of different bus structures and architectures, as well as control and data lines.

The device 1000 also includes computer-readable storage memory 1012 (e.g., memory devices) that enable data storage, such as data storage devices that can be accessed by a computing device, and that provide persistent storage of data and executable instructions (e.g., software applications, programs, functions, and the like). Examples of the computer-readable storage memory 1012 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 1000 may also include a mass storage media device.

The computer-readable storage memory 1012 provides data storage mechanisms to store the device data 1004, other types of information and/or data, and various device applications 1014 (e.g., software applications). For example, an operating system 1016 can be maintained as software instructions with a memory device and executed by the processing system 1008. The device applications may also include a device manager, such as any form of a control application, software application, signal-processing and control module, code that is native to a particular device, a hardware abstraction layer for a particular device, and so on. Computer-readable storage memory 1012 represents media and/or devices that enable persistent and/or non-transitory storage of information in contrast to mere signal transmission, carrier waves, or signals per se. Computer-readable storage memory 1012 do not include signals per se or transitory signals.

In this example, the device 1000 includes a video conference module 1018 that implements aspects of enhanced representations based on sensor data and may be implemented with hardware components and/or in software as one of the device applications 1014. In an example, the video conference module 1018 can be implemented as the video conference modules 112a, 112b described in detail above. In implementations, the video conference module 1018 may include independent processing, memory, and logic components as a computing and/or electronic device integrated with the device 1000. The device 1000 also includes video conference data 1020 for implementing aspects of enhanced representations based on sensor data and may include data from and/or utilized by the video conference module 1018, examples of which are described above.

In this example, the example device 1000 also includes a camera 1022 and motion sensors 1024, such as may be implemented in an inertial measurement unit (IMU). The motion sensors 1024 can be implemented with various sensors, such as a gyroscope, an accelerometer, and/or other types of motion sensors to sense motion of the device. The various motion sensors 1024 may also be implemented as components of an inertial measurement unit in the device.

The device 1000 also includes a wireless module 1026, which is representative of functionality to perform various wireless communication tasks. For instance, for the first device 102 and/or the second device 104, the wireless module 1026 can be leveraged to scan for and detect wireless networks, as well as negotiate wireless connectivity to wireless networks for the first device 102 and/or the second device 104. The device 1000 can also include one or more power sources 1028, such as when the device is implemented as a mobile device. The power sources 1028 may include a charging and/or power system, and can be implemented as a flexible strip battery, a rechargeable battery, a charged super-capacitor, and/or any other type of active or passive power source.

The device 1000 also includes an audio and/or video processing system 1030 that generates audio data for an audio system 1032 and/or generates display data for a display system 1034. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 1036. In implementations, the audio system and/or the display system are integrated components of the example device. Alternatively, the audio system and/or the display system are external, peripheral components to the example device.

Although implementations of enhanced representations based on sensor data have been described in language specific to features and/or methods, the subject of the appended claims is not necessarily limited to the specific features or methods described. Rather, the features and methods are disclosed as example implementations of enhanced representations based on sensor data, and other equivalent features and methods are intended to be within the scope of the appended claims. Further, various different examples are described and it is to be appreciated that each described example can be implemented independently or in connection with one or more other described examples. Additional aspects of the techniques, features, and/or methods discussed herein relate to one or more of the following:

In addition to the previously described methods, any one or more of the following:

In some aspects, the techniques described herein relate to a method, including: identifying, by a first device, at least one focal individual in a viewable region of a video capture device based on positional audio data and gesture information obtained from one or more sensors of the first device; generating an enhanced representation of the at least one focal individual by processing content associated with the at least one focal individual, the enhanced representation containing enhanced visual content and enhanced audial content pertaining to the at least one focal individual; and communicating the enhanced representation of the at least one focal individual for display in a user interface of a second device.

In some aspects, the techniques described herein relate to a method, where identifying the at least one focal individual includes validating the positional audio data against the gesture information to verify that the at least one focal individual is speaking.

In some aspects, the techniques described herein relate to a method, where identifying the at least one focal individual includes filtering location specific profile information associated with the at least one focal individual.

In some aspects, the techniques described herein relate to a method the gesture information includes gesture information from an individual other than the at least one focal individual.

In some aspects, the techniques described herein relate to a method, where said identifying the at least one focal individual includes: generating a position map of individuals present with the at least one focal individual; and identifying the at least one focal individual by correlating the positional audio data and the gesture information to the position map.

In some aspects, the techniques described herein relate to a method, where the enhanced representation includes a zoomed in view of the at least one focal individual.

In some aspects, the techniques described herein relate to a method, further including utilizing one or more super-resolution techniques to generate the enhanced representation.

In some aspects, the techniques described herein relate to a method, where generating the enhanced representation includes utilizing beamforming to suppress audio that does not originate with the at least one focal individual in the enhanced representation.

In some aspects, the techniques described herein relate to a method, where said generating the enhanced representation includes: determining, by the first device, a spatial position of the at least one focal individual relative to the first device; and generating the enhanced representation based on the spatial position, the enhanced representation including an orientation tag indicating a display orientation for the enhanced representation.

In some aspects, the techniques described herein relate to a method, where the enhanced representation includes information from a user profile associated with the at least one focal individual.

In some aspects, the techniques described herein relate to an apparatus including: a processing system implemented at least in part in hardware of the apparatus; and a video conference module implemented at least in part in hardware of the apparatus and executable by the processing system to: receive, by an audio sensor of a first device, positional audio data indicating a location of a source of audio from one or more individuals; detect, by the first device, facial gestures of the one or more individuals positioned in the location; identify, by the first device, at least one focal individual as speaking based on the positional audio data and detected facial gestures; generate an enhanced representation of the at least one focal individual, the enhanced representation containing visual and audial content; and communicate the enhanced representation of the at least one focal individual for display in a user interface of a second device.

In some aspects, the techniques described herein relate to an apparatus, where to identify the at least one focal individual is based on an indication from the positional audio data that the at least one focal individual is within the location and the detected facial gestures verify that the at least one focal individual is speaking.

In some aspects, the techniques described herein relate to an apparatus, where to identify the at least one focal individual includes correlating the positional audio data and detected facial gestures to location specific profile information associated with the at least one focal individual.

In some aspects, the techniques described herein relate to an apparatus, where the video conference module is further configured to determine a spatial position of the at least one focal individual relative to the first device and generate the enhanced representation based on the spatial position.

In some aspects, the techniques described herein relate to an apparatus, where the enhanced representation includes information from a user profile associated with the at least one focal individual.

In some aspects, the techniques described herein relate to a system including: one or more processors; and one or more computer-readable storage media storing instructions that are executable by the one or more processors to: identify at least one focal individual as speaking within a viewable region of a video capture device of a first device; determine a spatial position of the at least one focal individual relative to the first device; generate an enhanced representation of the at least one focal individual based on the spatial position, the enhanced representation containing enhanced visual content and enhanced audial content pertaining to the at least one focal individual; and communicate the enhanced representation of the at least one focal individual for display in a user interface of a second device.

In some aspects, the techniques described herein relate to a system, where to identify the at least one focal individual includes verifying audio data obtained from one or more audio sensors of the first device against facial gestures detected by the first device to validate that the at least one focal individual is speaking.

In some aspects, the techniques described herein relate to a system, where the enhanced representation simulates a perspective view of the at least one focal individual relative to the first device and utilizes spatialized audio to simulate an audial perspective relative to the first device.

In some aspects, the techniques described herein relate to a system, where the enhanced representation includes information from a user profile associated with the at least one focal individual.

In some aspects, the techniques described herein relate to a system, where the information from the user profile associated with the at least one focal individual includes one or more of a name, job description, position, technical background, company designation, contact information, user photo, or expertise.

The invention claimed is:
1. A method, comprising:
identifying, by a first device, at least one focal individual in a viewable region of a video capture device based on positional audio data and gesture information obtained from one or more sensors of the first device;
generating an enhanced representation of the at least one focal individual by processing content associated with the at least one focal individual, the enhanced representation containing enhanced visual content and enhanced audial content pertaining to the at least one focal individual and further including an orientation tag indicating a display orientation for the enhanced representation based on a spatial position of the at least one focal individual in relation to the first device; and communicating the enhanced representation of the at least one focal individual for display in a user interface of a second device.

2. The method of claim 1, wherein identifying the at least one focal individual includes validating the positional audio data against the gesture information to verify that the at least one focal individual is speaking.

3. The method of claim 1, wherein identifying the at least one focal individual includes filtering location specific profile information associated with the at least one focal individual.

4. The method of claim 1, wherein the gesture information includes gesture information from an individual other than the at least one focal individual.

5. The method of claim 1, wherein said identifying the at least one focal individual comprises:
generating a position map of individuals present with the at least one focal individual; and
identifying the at least one focal individual by correlating the positional audio data and the gesture information to the position map.

6. The method of claim 1, wherein the enhanced representation includes a zoomed in view of the at least one focal individual.

7. The method of claim 6, further comprising utilizing one or more super-resolution techniques to generate the enhanced representation.

8. The method of claim 1, wherein said generating the enhanced representation comprises utilizing beamforming to suppress audio that does not originate with the at least one focal individual in the enhanced representation.

9. The method of claim 1, wherein the enhanced representation includes information from a user profile associated with the at least one focal individual.

10. The method of claim 1, wherein the enhanced representation simulates a perspective view of the at least one focal individual in relation to the first device based on the orientation tag and utilizes spatialized audio to simulate an audial perspective relative to the first device.

11. An apparatus comprising:
a processing system implemented at least in part in hardware of the apparatus; and
a video conference module implemented at least in part in hardware of the apparatus and executable by the processing system to:
receive, by an audio sensor of a first device, positional audio data indicating a location of a source of audio from one or more individuals;
detect, by the first device, facial gestures of the one or more individuals positioned in the location;
identify, by the first device, at least one focal individual as speaking based on the positional audio data and detected facial gestures;
generate an enhanced representation of the at least one focal individual, containing visual and audial content, a display orientation of the enhanced representation based in part on a spatial position of the at least one focal individual; and
communicate the enhanced representation of the at least one focal individual for display in a user interface of a second device.

12. The apparatus of claim 11, wherein to identify the at least one focal individual is based on an indication from the positional audio data that the at least one focal individual is within the location and the detected facial gestures verify that the at least one focal individual is speaking.

13. The apparatus of claim 11, wherein to identify the at least one focal individual includes correlating the positional audio data and detected facial gestures to location specific profile information associated with the at least one focal individual.

14. The apparatus of claim 11, wherein the enhanced representation includes information from a user profile associated with the at least one focal individual.

15. The apparatus of claim 11, wherein the enhanced representation simulates a perspective view of the at least one focal individual in relation to the first device and utilizes spatialized audio to simulate an audial perspective relative to the first device.

16. A system comprising:
one or more processors; and
one or more computer-readable storage media storing instructions that are executable by the one or more processors to:
identify at least one focal individual as speaking within a viewable region of a video capture device of a first device;
determine a spatial position of the at least one focal individual in relation to the first device;
generate an enhanced representation of the at least one focal individual based on the spatial position, the enhanced representation containing enhanced visual content that simulates a perspective view of the at least one focal individual in relation to the first device and enhanced audial content to simulate an audial perspective relative to the first device; and
communicate the enhanced representation of the at least one focal individual for display in a user interface of a second device.

17. The system of claim 16, wherein to identify the at least one focal individual includes verifying audio data obtained from one or more audio sensors of the first device against facial gestures detected by the first device to validate that the at least one focal individual is speaking.

18. The system of claim 16, wherein the enhanced representation utilizes spatialized audio to simulate the audial perspective relative to the first device.

19. The system of claim 16, wherein the enhanced representation includes information from a user profile associated with the at least one focal individual.

20. The system of claim 19, wherein the information from the user profile associated with the at least one focal individual includes one or more of a name, job description, position, technical background, company designation, contact information, user photo, or expertise.

* * * * *